1,722,459

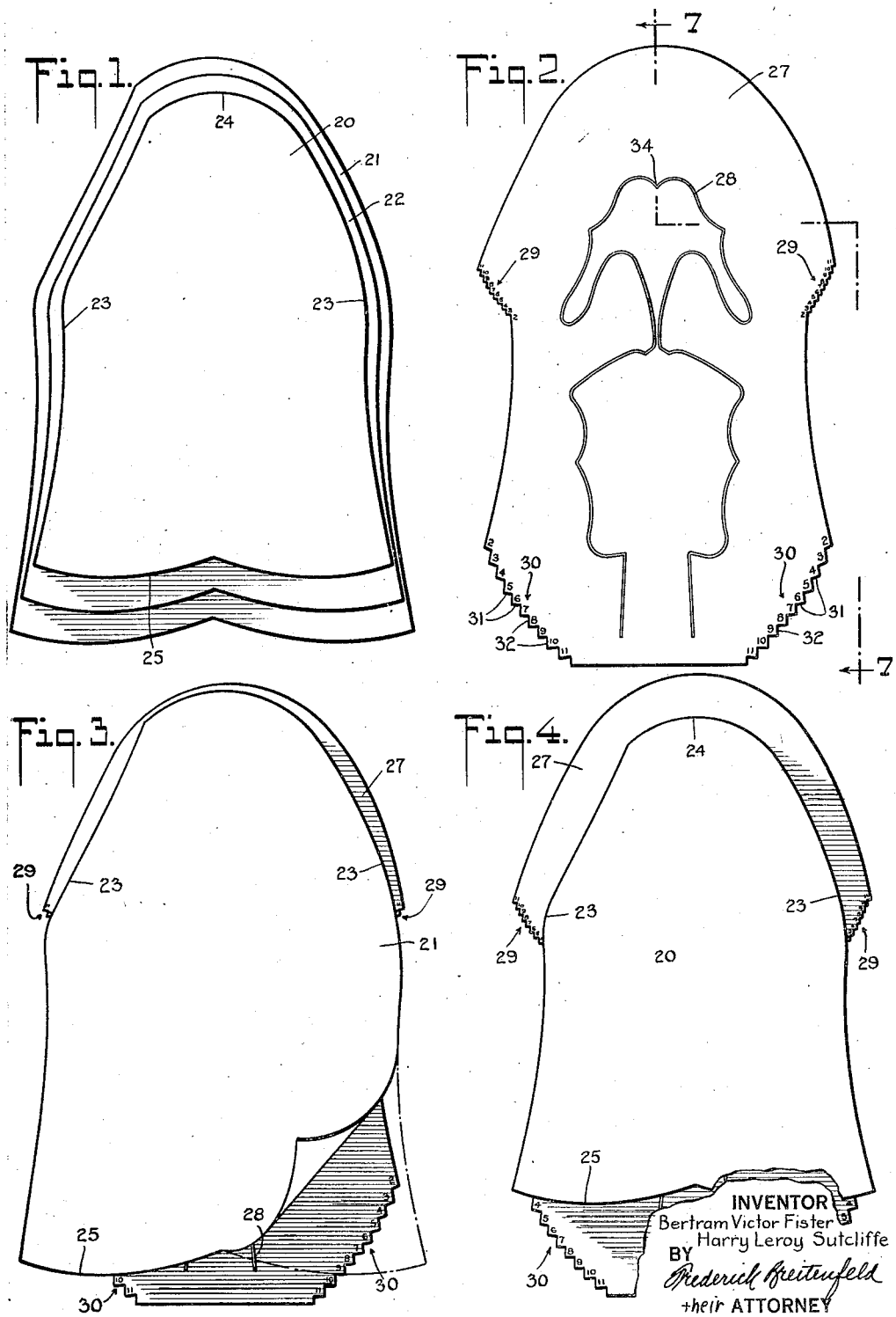

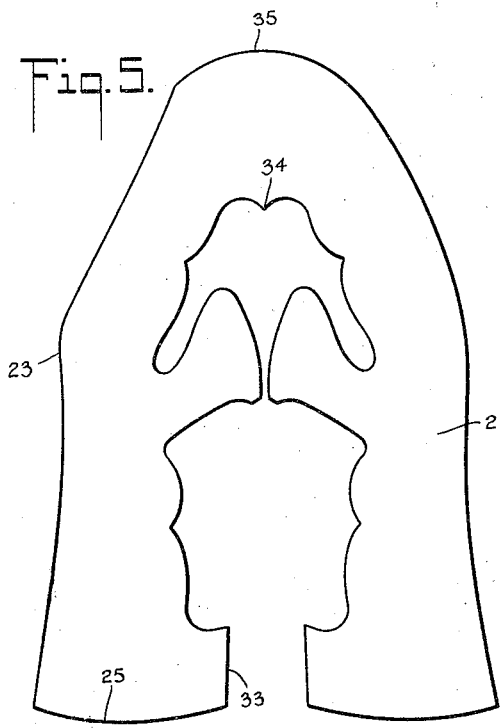
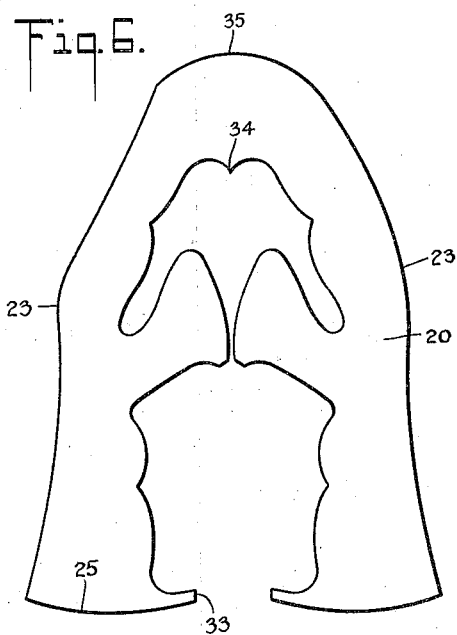
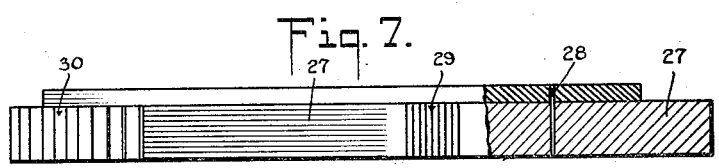
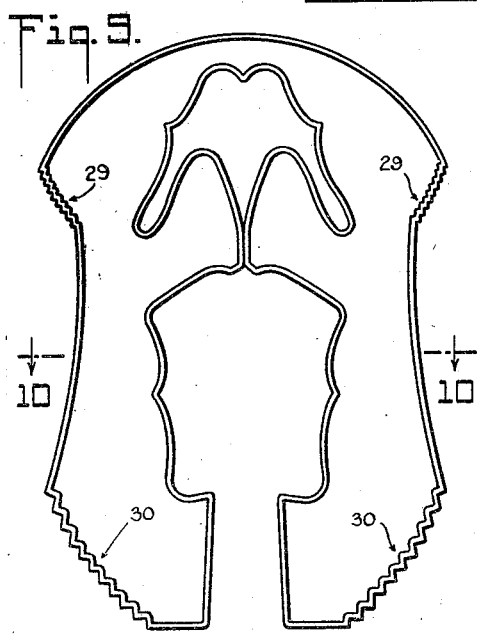
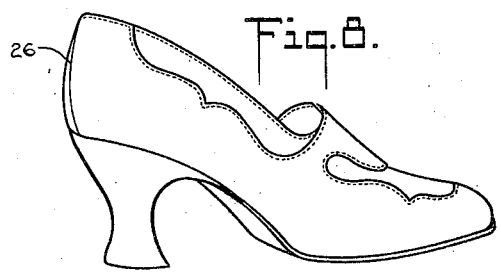
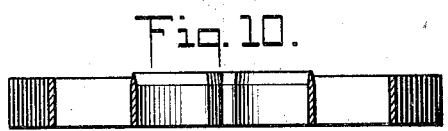
INVENTORS
Bertram Victor Fister
Harry Leroy Sutcliffe
their ATTORNEY Patented July 30, 1929.

UNITED STATES PATENT OFFICE.

BERTRAM VICTOR FISTER AND HARRY LEROY SUTCLIFFE, OF NEW YORK, N. Y.

DIE UNIT FOR CUTTING SHOE BLANKS.

Application filed January 21, 1926. Serial No. 82,632.

Our present invention relates generally to the manufacture of footwear, and has particular reference to an apparatus for manufacturing the uppers of a set of shoes covering a range of shoe sizes.

It is an object of our invention to provide an apparatus for forming an ornamental configuration in each of a set of blanks subsequently to be used in the manufacture of a set of ornamental shoes.

In the manufacture of the uppers of shoes of this character, particularly of the type embodying the "whole fox" construction, it has been customary heretofore to cut an ornamental configuration into each blank, either by hand or by means of a die, the configuration being slightly modified for each size of blank. Inasmuch as a range of shoe sizes comprising 16 lengths and approximately 4 widths is not unusual, particularly in shoes of the ornamental type which are designed for a selected clientele, the time, skill, labor, and expense heretofore entailed will be obvious.

It will be evident that in cases where dies are employed, the number of dies required may amount to 64 or over. Whereas it has been found necessary heretofore to provide a different die for each shoe size, it is an object of our present invention to provide a single die bearing a given configuration which may be utilized in a manner which dispenses with the necessity for any additional dies.

A feature of the invention lies in providing a die of this character in association with indicating means in the nature of graduated scales, the provision of which scales permit the die to be utilized in the manner contemplated.

In a preferred embodiment, the die comprises a cutting blade of cold-rolled steel, and associated therewith in predetermined fixed relation thereto is an arrangement of scales, suitably graduated, preferably according to shoe sizes.

More particularly, the invention contemplates the provision of a die for cutting a predetermined ornamental configuration along the interior edge of a blank which has been previously cut to embody a periphery corresponding to a certain size and width; and in causing the die to operate upon a predetermined portion of the blank, depending upon its size, by positioning the blank relatively to the die in accordance with the arrangement of graduated scales.

The objects generally of our invention are to provide a die which is of simple yet durable construction, inexpensive to manufacture, and capable of simple utilization by unskilled hands.

For the attainment of the foregoing objects and such other objects as may hereinafter appear or be pointed out, we have illustrated embodiments of our invention in the accompanying drawings, in which Fig. 1 is a plan view of three illustrative shoe blanks having peripheries which have been previously shaped for given sizes and widths; the blanks being shown in superposed positions;

Fig. 2 is a plan view of a die constructed in accordance with our invention and embodying an illustrative design;

Fig. 3 is a plan view of the relatively large blank suitably positioned in association with the die for the cutting therein of the illustrative design;

Fig. 4 is a view similar to Fig. 3, showing the relatively small blank in proper relative association with the same die preparatory to cutting the same given design upon the smaller blank;

Figs. 5 and 6 are plan views of the blank shown in Figs. 3 and 4 after the illustrative design has been cut therein;

Fig. 7 is a side view of the die illustrated in Fig. 2, shown partly in section along the line 7—7 of Fig. 2;

Fig. 8 is a perspective view of a completed shoe constructed of the blank shown in either Figs. 5 or 6;

Fig. 9 is a view similar to Fig. 2, showing a modified form of construction; and Fig. 10 is a cross-section along the line 10—10 of Fig. 9.

Referring to the drawings, and particularly to Fig. 1, it will be observed that we have shown three superposed blanks, selected at random for illustrative purposes from a complete set of shoe sizes. The smallest blank 20 may be considered for purposes of illustration, a size 3 blank, the largest blank 21 may be considered for a similar purpose a size 9 blank, and the intermediate blank 22 may be considered some intermediate size, such as size 6. It will be understood that these blanks are for right or left shoes only, a separate complete set being required for the complementary shoe. The blanks which we have shown are for shoes embodying the so-called "whole Fox" construction, no separate tip or quarter being required; but it will be obvious hereinafter that our invention is not necessarily limited to blanks of this type. Each of the blanks illustrated has been cut according to predetermined gradings to embody a periphery required for a given shoe size. Thus, the blank 20 has side edges 23, a front edge 24, and a rear edge 25. In the blank shown, the rear edge 25 comprises two adjacent convexly curved portions, symmetrical and suitably shaped so as to constitute the proper contour for the rear vertical line 26 of the finished shoe, (see Fig. 8) when the shoe is completed.

In Fig. 2, we have illustrated a die which is illustrative of a type which we have found preferable for the carrying out of our invention. This die comprises a base 27, of wood or other suitable material, in which there is inserted a blade 28 of cold-rolled steel or similar material, the blade defining a certain desired design. Preferably the base 27 has slots cut therethrough into which the blade 28 is forcibly inserted so as to present its cutting edge in a suitable manner to a blank which may be brought into association with the die.

Associated with the base 27, and preferably along the periphery thereof, we provide suitable scales bearing predetermined positional relations to the blade 28, and suitably graduated to provide predetermined sub-divisions or indicia bearing certain relations to the set of shoe blanks to be cut. In the embodiment shown in Fig. 2, we have shown these scales in the form of steps, a pair 29 being positioned along the side edges of the base 27, substantially midway thereof, and symmetrical with respect to the longitudinal axis of the die. Another pair 30 is positioned at the rear corners of the base 27, also symmetrically and similarly arranged. The steps are provided to constitute graduations, preferably according to shoe sizes, and they comprise transverse sides 31 and longitudinal sides 32. As will be more fully understood hereinafter, the transverse sides 31 are of primary importance in the scales 30, while the longitudinal sides 32 are of primary importance in the scales 29.

Referring now to Figs. 3 and 4, we have shown in the former the blank 21 suitably positioned in association with the die preparatory to cutting the desired design thereinto. Continuing the assumption that the blank 21 represents a size 9 blank, it is laid over the die in a predetermined position depending upon its size. The proper positioning of the blank is accomplished by utilizing the scales 29 and 30 as guides; and in the preferred embodiment of the invention, wherein the preferred die of Fig. 2 is utilized, the transverse sides 31 of the scales 30 are suitably designed and arranged so that the rear edge 25 of the blank 21 may be brought into a registry with the sides 31 corresponding to the size 9 shoe. This registry is clearly shown in Fig. 3, and in this connection it will now be obvious that with blanks having convexly curved rear edges 25, the transverse sides 31 of the scales 30 must be designed to lie along convexly curved arcs so that absolute registry may be attained. Similarly, the side edges 23 of the blank 21 are brought into proper registry with the corresponding longitudinal sides 32 of the scales 29. The latter scales serve to determine the proper lateral positioning of the blank, while the scales 30 determine the proper longitudinal positioning thereof. After the blank has been properly positioned, the die is manipulated to stamp the desired configuration into the blank.

In Fig. 4, we have illustratively shown the blank 20 in suitable relative position in association with the die, and it will be understood that its side edges 23 have been brought into registry with the proper sides 32 of the scales 29 and the proper sides 31 of the scales 30.

Figs. 5 and 6 illustrate the blanks 21 and 20 with the design cut therein along what will subsequently be the upper periphery of the shoe. It will now be obvious that the utilization of one single die, and consequently a design of one size, for the cutting of a configuration into each of the set of blanks necessitates the locating of the configuration upon the blank with great care and in accordance with careful and accurate predetermined judgment; otherwise it may impair the appearance of the blank. Thus, it will be seen that the unconfigurated rear portion 33 of the shoe blank 21 is longer than the corresponding portion of the blank 20. Similarly, the distance between the foremost central point 34 of the design and the central tip 35 of the blank is greater in the blank 21 than in the blank 20. If the blank were not positioned in association with the die in proper predetermined relation thereto, the lengths of the portions 33, or the distances between the points 34 and 35, or the relative proportions of these lengths and distances, may be such as to seriously affect the pleasing appearance of the finished shoe. These factors have heretofore required the cutting of designs which were graded, and accordingly different, for each size of blank. According to our invention, only one design and one single die is required, and the factors referred to are accounted for by the proper designing and positioning of the scales 29 and 30. In other words, the graduations of the scales 29 and 30 are the results of careful experimental design, and may differ with each particular configuration which is in contemplation. But once having been determined, the necessity for any further dies is eliminated, and particularly in cases where the ornamental configuration is of a complicated nature, the saving both in time, skill, and expense, will be evident.

Figs. 9 and 10 illustrate a modified form of die, wherein the base 27 has been dispensed with, and the scales 29 and 30 are provided by continuing the material of the blade outwardly and forwardly to encircle the design portion, and by shaping this material itself to constitute steps similar to those shown in Fig. 2. This modification is illustrative of numerous constructions which might be made by those skilled in the art for the purpose of carrying out our invention; and more particularly, this type of construction might be suitable for dies which are made of other metal besides cold-rolled steel.

It will thus be seen that we have provided an apparatus for cutting and designing a set of shoe blanks, whereby the production of ornamental shoes of this character is greatly facilitated and simplified. It will be obvious that a wide variety of shoe blanks may be cut in accorlance with this method, and that a vast number of dies may be constructed embodying the features herein set forth. Many changes in the details herein described for the purpose of explaining the nature of our invention may be made by those skilled in the art without departing from the spirit and scope of the invention as expressed in the appended claims; and it is therefore intended that these details be interpreted as illustrative and not in a limiting sense.

Having thus described our invention and illustrated its use, what we claim and desire to secure by Letters Patent, follows:

1. A die unit for direct application to each of a set of vari-sized shoe blanks so as to cut a common design upon each thereof, said unit comprising a configured cutting instrumentality, and marginal portions of the unit being configured to provide stepped scales graduated according to shoe sizes, said steps comprising sides substantially conforming in contour with predetermined edge portion of the shoe blanks, whereby the unit may be directly applied to a selected blank in predetermined positional relation dependent upon the size of the selected blank by bringing into registry certain stepped sides and certain edge portions of the blank.

2. A die unit for direct application to each of a set of vari-sized shoe blanks so as to cut a common design upon each thereof, said unit comprising a configured cutting instrumentality, and marginal portions of the unit being configured to provide stepped scales graduated according to shoe sizes, said steps comprising sides substantially conforming in contour with the rear edges of the shoe blanks, whereby the unit may be directly applied to a selected blank in a predetermined positional relation dependent upon the size of the selected blank by bringing the rear edge of the blank into registry with the proper stepped sides.

3. A die unit for cutting a common design upon each of a set of vari-sized shoe blanks, said unit comprising a configured cutting instrumentality, and indicating means fixedly associated with the unit in predetermined positional relation to said instrumentality, said means comprising two sets of scales graduated according to shoe sizes, one scale comprising graduations which conform in contour with rear edge portions of the blanks, and the other scale comprising graduations which conform in contour with side edge portions of the blanks, whereby mutual association of the unit and a selected blank in predetermined positional relation dependent upon the size of the selected blank may be effected by suitably positioning the rear and side edges of the blank with the proper graduations of said respective scales.

4. A die unit for cutting a common design upon each of a set of vari-sized shoe blanks of the whole fox type, said unit comprising a block, a blade strip configured to the desired design and embedded in said block, and indicating means carried by said block in fixed positional relation to the blade, said means being of a character to permit direct application of a selected blank to the block in predetermined positional relation to the blade dependent upon the size of the blank selected.

5. A die unit of the character described comprising a block, and a suitably configured cutting instrumentality embedded in said block, certain edges of the block being configured to provide graduated guides in fixed positional relation to the blade, whereby a blank may be applied to the block in predetermined positional relation to the blade by registering certain portions of the blank with certain guides.

In witness whereof, we have signed this specification this 2nd day of January, 1926.

BERTRAM VICTOR FISTER.
HARRY LEROY SUTCLIFFE.